United States Patent
Cline (10) Patent No.: US 11,561,045 B1
(45) Date of Patent: Jan. 24, 2023

(54) POWER SUPPLY AND METHOD TO DETER MOLD

(71) Applicant: Thomas Cline, Seattle, WA (US)

(72) Inventor: Thomas Cline, Seattle, WA (US)

( * ) Notice: Subject to any disclaimer, the term of this patent is extended or adjusted under 35 U.S.C. 154(b) by 484 days.

(21) Appl. No.: 16/849,965

(22) Filed: Apr. 15, 2020

(51) Int. Cl.
| | |
|---|---|
| *F26B 21/08* | (2006.01) |
| *F24F 3/14* | (2006.01) |
| *H05B 1/02* | (2006.01) |
| *F26B 21/10* | (2006.01) |
| *F24D 19/10* | (2006.01) |
| *F24F 110/10* | (2018.01) |
| *F24F 110/20* | (2018.01) |

(52) U.S. Cl.
CPC ............ *F26B 21/08* (2013.01); *F24F 3/1411* (2013.01); *F26B 21/10* (2013.01); *H05B 1/0297* (2013.01); *F24D 19/1096* (2013.01); *F24F 2110/10* (2018.01); *F24F 2110/20* (2018.01)

(58) Field of Classification Search
CPC ... H05B 1/0297; F24F 3/1411; F24F 2110/10; F24F 2110/20; F26B 21/08; F26B 21/10; H01R 13/66
See application file for complete search history.

(56) References Cited

U.S. PATENT DOCUMENTS

| | | |
|---|---|---|
| 2,053,771 A | 9/1936 | Erschen |
| 3,840,176 A | 10/1974 | Baysinger |
| 4,465,229 A | 8/1984 | Kompelien |
| 4,703,886 A | 11/1987 | Kirby |
| 4,877,182 A | 10/1989 | Pugh |
| 5,082,173 A | 1/1992 | Poehlman |
| 5,232,152 A | 8/1993 | Tsang |
| 5,915,473 A | 6/1999 | Ganesh |
| 6,220,039 B1 | 4/2001 | Kensok |
| 7,340,907 B2 | 3/2008 | Vogh |
| 7,740,184 B2 | 6/2010 | Schnell |
| 7,758,408 B2 | 7/2010 | Hagentoft |
| 7,793,510 B2 | 9/2010 | Perry |
| 8,112,181 B2 | 2/2012 | Remsburg |
| 8,161,761 B2 | 4/2012 | Shao |
| 8,209,059 B2 | 6/2012 | Stockton |
| 8,292,192 B1 | 10/2012 | Purswell |
| 8,393,549 B2 | 3/2013 | Pieper |
| 8,567,688 B2 | 10/2013 | Weisenberger |
| 8,863,536 B1 | 10/2014 | Perry |
| 2005/0085178 A1 | 4/2005 | Hall |
| 2005/0217132 A1 | 10/2005 | Ashford |
| 2006/0217934 A1 | 9/2006 | Armstrong |
| 2011/0101118 A1 | 5/2011 | Criss |

(Continued)

*Primary Examiner* — Nelson J Nieves (57) ABSTRACT

An apparatus and method to deter mold growth on the interior surfaces of buildings. The apparatus is a corded and plugged power supply with adjustable temperature and humidity sensors, logic circuitry, and split duplex receptacles. The method employs the apparatus, a portable heater, an array of portable fans, and catchments containing a hygroscopic substance such as calcium chloride. One receptacle controls the heater. The other receptacle controls the fans. There are three operative states: a heat-on/fans-on state at low temperature, a heat-off/fans-on state at high temperature and high humidity, and an idle state at high temperature and low humidity. The catchments capture water vapor circulated by the fans.

8 Claims, 4 Drawing Sheets

(56) References Cited

U.S. PATENT DOCUMENTS

| | | | |
|---|---|---|---|
| 2011/0217875 A1* | 9/2011 | Lee | H01R 13/66 |
| | | | 439/620.24 |
| 2012/0015597 A1 | 1/2012 | Foreman | |
| 2014/0081468 A1 | 3/2014 | Potter | |
| 2014/0180486 A1 | 6/2014 | Newman, Jr. et al. | |
| 2016/0019769 A1 | 1/2016 | Mumey | |
| 2018/0059175 A1 | 3/2018 | Hase | |
| 2021/0008312 A1* | 1/2021 | Young | A61M 16/021 |

\* cited by examiner

POWER SUPPLY AND METHOD TO DETER MOLD

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR

Not Applicable

TECHNICAL FIELD

The field of art to which this invention belongs is the regulation of indoor temperature and humidity through the use of sensors and logic circuitry.

BACKGROUND ART

The growth of mold colonies within buildings is a recognized detriment both to human health and to structural integrity. Medical authorities have linked indoor mold to respiratory infections, asthma, and dementia. Mold spores require liquid water in order to propagate into colonies. An attractive strategy for deterring mold growth would therefore be to deprive mold spores of that liquid water.

The mold problem is not evenly distributed among geographical regions. It is a particular problem in regions with high humidity during winter months. One such region is the temperate west coast of North America. This region has prevailing westerly winds which bring humid air onshore from the Pacific Ocean. According to a table published by the National Climatic Data Center, four reporting stations in the coastal regions of Oregon and Washington are the only locations in the United States where relative humidity reaches an average daily high value greater than 90 percent during the month of January.

The process by which water condenses from the air is best understood through the concept of the dew point. A dew point is a reference temperature, equal to or lower than the actual air temperature, at which water vapor will saturate the air and begin to condense onto surfaces. It varies in direct proportion to the concentration of water molecules in the air, and this is why the dew point tends to be higher in the Pacific Northwest than in other regions with similar temperatures.

Ambient temperature tends to follow a daily cycle, reaching its lowest point in the hours just before dawn. This is also when the indoor temperature of an unheated building is most likely to reach the dew point and stay near it for a period of hours. Condensation will be the result, and it will first become evident on the interior surfaces of windows. But it will also appear on the interior surfaces of external walls. If liquid water remains on those surfaces for a sufficient number of hours, mold colonies will begin to propagate.

The mold problem is likewise not evenly distributed among buildings within a particular region. An uninsulated building is more susceptible to mold growth because, absent a continuously functioning heating system, its interior temperature cycle will tend to have a higher amplitude than the temperature cycle of an insulated building. This implies that an uninsulated building will have longer daily intervals for condensation to occur at the low end of the cycle. A building with gypsum walls will be more susceptible to mold growth than a building with wood panel walls. A study has shown that a common process for manufacturing gypsum sheet rock uses raw materials which are contaminated with mold spores. A building with a single-point heat source is more susceptible to mold growth than a building with a distributed heat source. This is because areas of the building remote from the single heat source will have lower temperatures, making their surfaces more likely to experience condensation. A building with a vent-free gas furnace will be more susceptible to mold growth than a building with a different type of furnace because vent-free combustion releases water vapor into the building, elevating the dew point of the interior air.

The mold problem is a particular concern for owners of vacation homes and others whose properties are vacant for long intervals in cold humid regions. If a structure is more than a few decades old, it will not likely contain an HVAC system which is designed to control mold growth. The installation of an entirely new system is likely to be cost-prohibitive, and it would be costly to leave such a system running even if it were in place. Remediation orders and demolitions due to mold infestations are relatively common among the population of older structures within the affected regions.

Although the control of temperature and humidity is a principal concern of the HVAC industry, this industry, with some exceptions, has focused more upon HVAC systems installed during the construction process and upon control devices which can be added to existing ducted HVAC systems. Exceptions include a number of stand-alone innovations for attic and crawl-space ventilation. But the industry seems to have overlooked the concerns of building owners with more antiquated HVAC systems who need an after-market solution for deterring mold growth. The problem is acute for buildings with ductless systems, such as electrical-resistive systems or single-point propane systems. The problem is particularly acute for buildings with vent-free gas furnaces.

The control of temperature and humidity within buildings has also been a concern of the manufacturers of portable dehumidifiers, air conditioners, and heaters. These three types of appliances are similar to the preferred embodiment of this invention in that none of them may draw through the receptacle into which they are plugged a current greater than 80 percent of its rating. Most cord-and-plug appliances are therefore rated at 12 amperes or less. How an appliance uses this allotment of amperage measures its effectiveness as a mold deterrent.

Dehumidifiers and air conditioners find their best use in warm climates and during the summer in temperate climates. But they are not effective at preventing condensation during the winter in temperate climates. Both appliances remove water vapor from the air by a motor-driven compression-expansion process which creates a cold surface on which condensation occurs. But if the temperature of the surfaces within the building are not controlled, they can also become cold surfaces on which condensation occurs—surfaces with a much greater area. If this occurs in cold weather when there is little variation in outdoor temperature due to stagnant air and cloud cover, then liquid water can persist on indoor surfaces despite the presence of an operating dehumidifier. This is due to the high latent heat of vaporization of water—the additional energy required to transform it from a liquid to a vapor at a given temperature. If the indoor and outdoor temperatures have reached equilibrium, there will be little transmission of thermal energy from the environment into the interior of the building. This will create, in turn, an equilibrium between the saturated indoor air and the liquid water on interior surfaces—a set of conditions that a dehumidifier alone may not be able to overcome. Dehumidifiers are designed to remove water vapor from the air without adding thermal energy. Although dehumidifiers do produce heat during the compression process, the cooling produced during the expansion process offsets that heat. To adequately protect the building there must be an exogenous source of thermal energy greater than the latent heat of vaporization of the liquid water on its interior surfaces.

A portable heater would be an efficient means of providing that thermal energy. But a portable heater becomes more costly and more inefficient as a mold deterrent device the further it increases the indoor air temperature above the dew point. At a certain point there will no longer be liquid water on interior surfaces. A method which then de-energizes the heater but continues to circulate the air and remove water vapor would be an sufficient deterrent of condensation until it was once again necessary to add heat to the system.

Therefore, a method which heats and agitates the air and captures water vapor has the potential to become an effective mold deterrent system in a cold humid climate. If there exists a means other than electric power to accomplish one of these tasks, then a control apparatus that devoted its 12-ampere capacity to the other two tasks could prove to be an optimal solution.

BRIEF SUMMARY OF THE INVENTION

The preferred embodiment of this invention is an apparatus about the size and weight of a kitchen countertop appliance which plugs into a household receptacle providing 120 VAC of power through a circuit rated at 15 or 20 amperes. It contains an adjustable thermostat, an adjustable dehumidistat, and a single set of split duplex receptacles which are jointly controlled by the thermostat and dehumidistat. One of the receptacles is the "heat outlet," which connects to a portable radiant space heater. The other receptacle is the "fans outlet," which connects to a number of low-amperage portable fans by means of extension cords and splitter cords.

The apparatus operates as a control center for a household mold deterrence method. An essential part of this method is the placement throughout the building of glass, ceramic, or plastic bowls containing calcium chloride granules, a non-toxic substance that absorbs water vapor from the air.

The thermostat exclusively controls the heat outlet, but it also provides the control voltage to an electromechanical relay which energizes the fans outlet whenever the heat outlet is energized. A solid-state relay is contraindicated for this function because its heat output would interfere with the operation of the thermostat. If the thermostat is set at approximately 45° F., this will ensure the circulation of warm air to raise the temperature of interior surfaces when the danger of condensation would otherwise be at its greatest. But when the immediate danger of condensation has passed, particularly during the warmer parts of the day, the thermostat will turn the heater off. The dehumidistat will then take over, powering the fans so that air will continue to circulate throughout the house whenever the indoor relative humidity remains higher than its set point. In this fans-only state, the circulating air will continue to transport water vapor over the bowls of calcium chloride, optimizing the hygroscopic activity of that substance. This will lower the dew point within the house, reduce the likelihood of condensation, and permit more time for the heater to warm interior surfaces during the cooler phase of the daily temperature cycle. When the indoor air reaches its optimal state for mold deterrence—an elevated temperature and a lower humidity—the apparatus becomes idle.

The main advantage of this mold deterrence method—besides its portability, convenience, and dramatically lower cost compared to a new HVAC system—is its energy savings. A typical small portable fan draws about one-half ampere, compared to an electric space heater on a medium power setting which draws about ten amperes. Depending upon how many fans are used, the reduction in energy costs when the fans are "on" but the heater is "off" would vary from 80 to 95 percent.

The preferred embodiment of this invention finds its best use as part of a winterization strategy for vacation homes and other seasonally unoccupied structures. It contains an overcurrent circuit interrupter that limits the maximum total load to 12 amperes, and it can also contain a ground-fault/arc-fault circuit interrupter. After the initial set up, the apparatus is designed to operate without human intervention. If grid power to the building is lost, the apparatus will automatically re-activate when power is restored.

DETAILED DESCRIPTION OF THE INVENTION

The preferred embodiment of the invented apparatus 31 contains a NEMA 5-15P plug 10 which allows it to access line power from receptacles rated at 15 or 20 amperes.

The illustrated embodiment also includes an arc-fault/ground-fault circuit interrupter 11 which mediates the flow of line current to the circuitry of the apparatus 31 and to connected devices. The AFGF interrupter 11 will remain open at start-up if it detects a fault, and it will open and remain open until manually reset if it detects a fault during operation.

Figure 4:
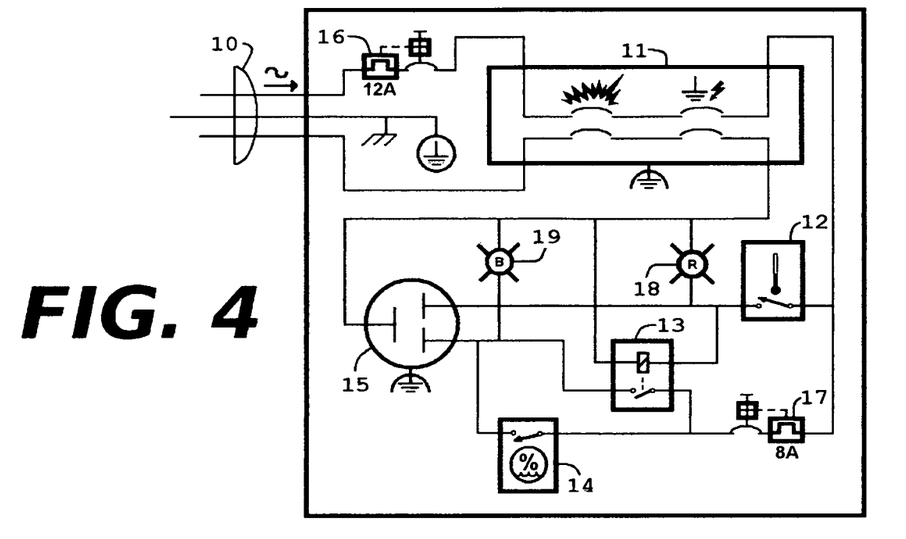
FIG. 4 is a schematic diagram of the circuitry and components of the preferred embodiment of the invented apparatus.

The load circuit extending from the AFGF circuit interrupter 11 splits into two branch circuits, one of which is controlled by a thermostat 12 and the other of which is controlled by a dehumidistat 13. If the apparatus 31 becomes energized while the thermostat 12 contacts are closed, the output from the thermostat would illuminate the red indicator light 18, energize the "heat outlet" of the split duplex receptacles 15, and close the contacts of a normally-open single-pole single-throw electromechanical relay 13. The output from the relay 13 would illuminate the blue indicator light 19 and energize the "fans outlet" of the split duplex receptacles 15. Any portable heater 32 and all portable fans 33 connected to the apparatus 31 would be energized under this condition. But if the apparatus 31 becomes energized while the thermostat 12 contacts are open, the red indicator light 18 would remain off, and the "heat outlet" of the split duplex receptacles 15 would remain de-energized. If, under this condition, the dehumidistat 14 contacts are closed, the output from the dehumidistat would illuminate the blue indicator light 19 and energize the "fans outlet" of the split duplex receptacles 15. But if the thermostat 12 contacts and dehumidistat 14 contacts are both open, no current would flow through the apparatus 31, and both of the split duplex receptacles 15 will would remain de-energized.

The National Electrical Code requires that the preferred embodiment of the invented apparatus 31 draw through the receptacle into which it is plugged an amperage no greater than 80 percent of the rating for that receptacle. The illustrated embodiment therefore contains a 12-ampere overcurrent circuit interrupter 16 connected in series with the line input circuit. This allows it to be plugged into a 15-ampere household receptacle. Insofar as many dehumidistats have a current rating below 12 amperes, it may be necessary to connect a second overcurrent circuit interrupter 17 in series with the dehumidistat. An example of a second overcurrent circuit interrupter 17 is illustrated in FIG. 4.

The inner shell of the illustrated embodiment is a six-gang steel masonry junction box 20. Circuitry shall be installed within this junction box 20 consistently with the schematic diagram shown in FIG. 4 and with good wiring practices.

The outer shell 21 of the illustrated embodiment consists of two layers of 6-mm thick polymer paneling of a type which is suitably durable and highly resistive to electric current and fire. The inner layer of the outer shell consists of a network of standoff strips cut and shaped to fit around knockouts which protrude from the junction box 20 on each of its five solid faces. The spaces between these strips will also accommodate the bottom ends of screws used to fasten items within the junction box 20. The outer layer of the outer shell consists of five panels attached to the standoff strips in superposition to each of the five solid faces of the junction box 20. The standoff strips are attached to the junction box 20 by means of high-bond adhesive tape 28 sold by the 3M Company under the trademark VHB™ TAPE. The five panels of the outer layer are attached to the standoff strips by the same means or by means of another suitable adhesive.

Figure 2:
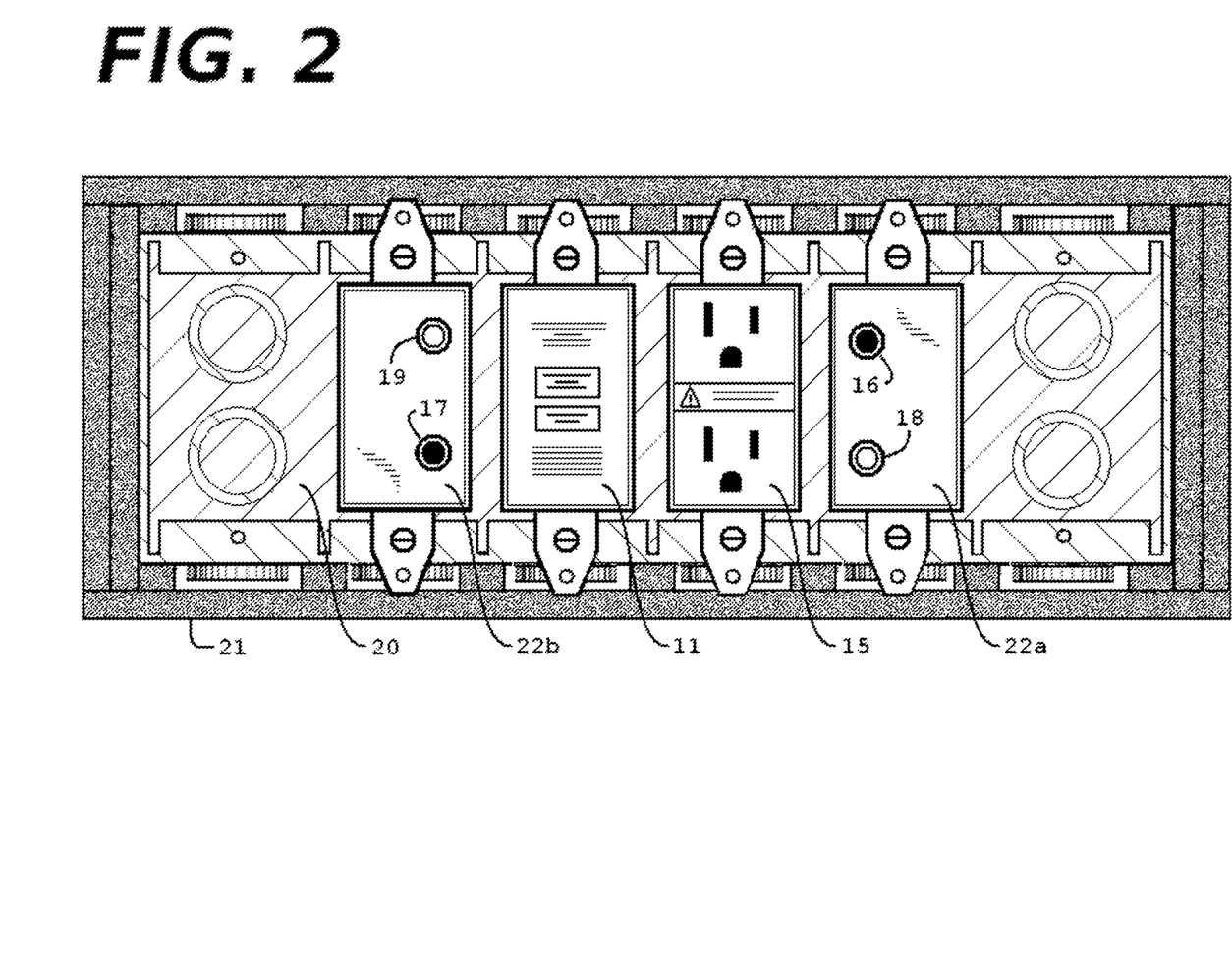
FIG. 2 is a plan view of the inner and outer shells of the preferred embodiment of the invented apparatus with four components attached.

After completion of the outer shell, the AFGF circuit interrupter 11 and the split duplex receptacles 15 are both wired then attached to the inner two gangs of the junction box 20. The split duplex receptacles 15 should contain a notice that they are indeed split. The next step in the assembly would be to drill corresponding pairs of mounting holes through two identical blank inserts. The 12-ampere overcurrent circuit interrupter 16 and the red indicator light 18 are then attached through the mounting holes of one of these inserts 22a, and the second overcurrent circuit interrupter 17 and the blue indicator light 19 are attached through the mounting holes of the other insert 22b. Each overcurrent circuit interrupter shall have a push-button reset function. These four attachments are wired to the circuitry, then the inserts 22a and 22b are attached in opposite configurations to the two gangs of the junction box 20 adjacent to the two components already installed. This stage of the assembly is illustrated in FIG. 2.

Figure 3:
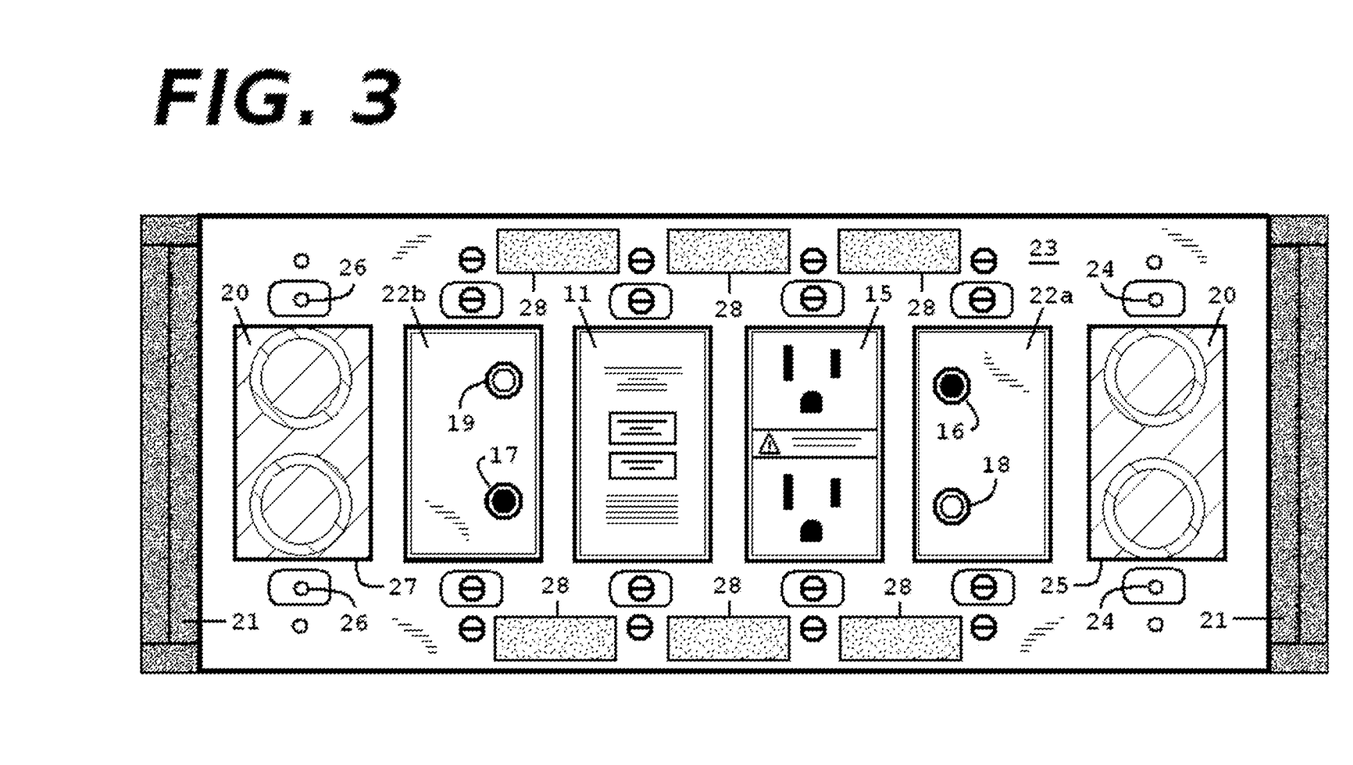
FIG. 3 is a plan view of the preferred embodiment of the invented apparatus, complete except for the face plate, thermostat, dehumidistat, power cord, and corner guards.

The next step in the assembly is the attachment of a base plate 23. The base plate 23 in this preferred embodiment is a rectangular polymer panel containing six rectangular apertures which correspond to the six gangs of the junction box 20. The base plate 23 seats precisely against the four components already attached. The outer two apertures remain temporarily open. The base plate 23, as attached, contains four openings that allow access to the outermost pairs of threaded holes 24 and 26 within the junction box 20. Strips of high-bond adhesive tape 28 are attached along the upper and lower edges of the base plate 23. This stage of the assembly is illustrated in FIG. 3.

Figure 1:
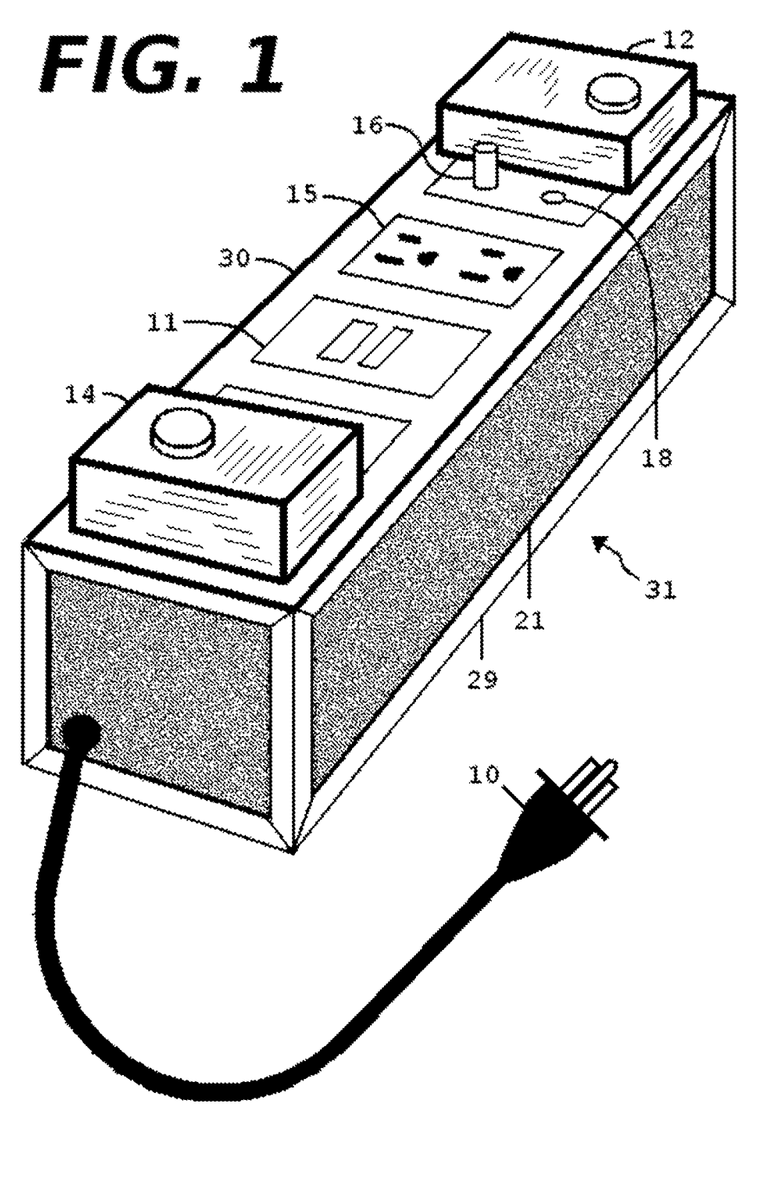
FIG. 1 is a perspective view of the preferred embodiment of the invented apparatus.

The next step in the assembly of the illustrated embodiment would be the attachment of polymer corner guards 29 over the edges of the outer shell 21. A face plate 30 is then attached over the base plate 23. The face plate 30 is a rectangular polymer panel with dimensions corresponding to the horizontal cross section of the outer shell 21. It contains six apertures corresponding to the six apertures within the base plate. Before the installation of the face plate 30, four holes are drilled through it corresponding to the two pairs of threaded holes 24 and 26 remaining unused within the junction box 20. The leads of the thermostat 12 are wired to the circuitry through the open aperture 25 adjacent to the red indicator light 18, then the unit itself is attached to the apparatus 31 with screws tightened through the adjacent threaded holes 24. The leads of the dehumidistat 14 are wired to the circuitry through the open aperture 27 adjacent to the blue indicator light 19, then the unit itself is attached to the apparatus 31 with screws tightened through the adjacent threaded holes 26. The face plate 30 is secured to the apparatus 31 by the clamping force of the thermostat 12 and dehumidistat 14 and by the adhesive force of the high-bond tape 28 that was positioned on the upper face of the base plate 23. The completed apparatus 31 is illustrated in FIG. 1.

Figure 5:
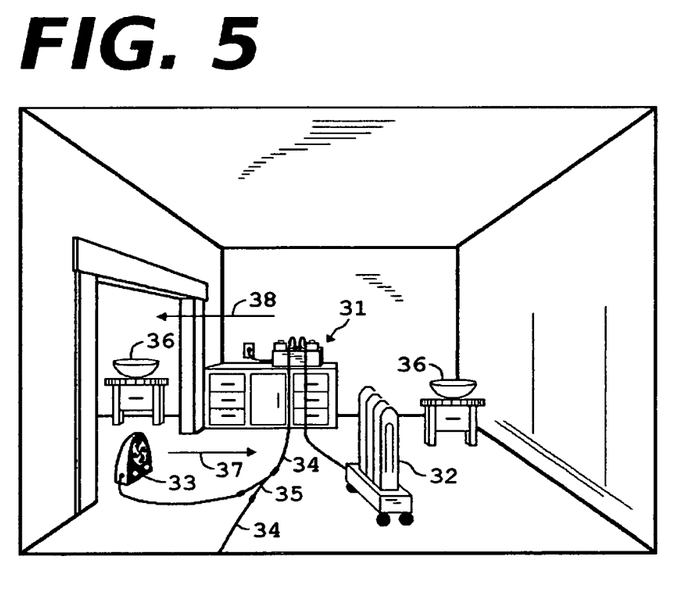
FIG. 5 is a perspective view of the interior of a structure which illustrates an implementation of the invented method.

The invented method of deterring the condensation of water upon the interior surfaces of an enclosed structure is illustrated in FIG. 5. This method involves an interaction among three types of interconnected electrical devices and one type of chemical substance. The method achieves its goal by heating the indoor air, agitating it, and capturing water vapor. The apparatus 31 functions as the control center for a portable electric heater 32 and for a plurality of low-amperage portable electric fans 33. The fans 33 are connected together by extension cords 34 and splitter cords 35 to draw current through a single plug. One fan 33 should be placed at each doorway threshold to create air movement 37 toward the heater 32. This will create a vortex with a counterbalancing movement of warmer air 38 through the upper portion of the doorway. The apparatus 31 will activate the heating and agitation of indoor air when the temperature is below a selected set point. The heating will provide the thermal energy to overcome the latent heat of vaporization of any liquid water on an interior surface, and it will elevate the temperature of the air above its dew point. The agitation of the air will optimize the hygroscopic effect of catchments 36 containing calcium chloride by circulating water vapor over them at a faster rate than would be accomplished by diffusion alone. The apparatus 31 will continue to operate the fans 33 even if the temperature rises above the selected set point, provided the relative humidity of the indoor air remains above its selected set point. The continuing hygroscopic reaction between water vapor and the calcium chloride granules will lower the dew point of the indoor air, thereby lowering the temperature at which the condensation of water would occur.

The invention claimed is:

1. An electric power-supply apparatus having a cord and a plug for access to a source of electrical energy, a thermostat with contacts that are closed if an ambient air temperature is below a set point of the thermostat but are open if the ambient air temperature is above the set point of the thermostat, a dehumidistat with contacts that are open if an ambient relative humidity is below a set point of the dehumidistat but are closed if the ambient relative humidity is above the set point of the dehumidistat, and at least two receptacles, wherein an improvement comprises:
   a) the thermostat (12) and the dehumidistat (14) are positioned on separate parallel paths of a circuit which brings electrical energy into the apparatus;
   b) the thermostat is energized if the apparatus is energized;
   c) at least one of the receptacles is energized if the apparatus is energized and the contacts of the thermostat are closed but is not energized if the contacts of the thermostat are open; and
   d) at least one other receptacle is energized if the apparatus is energized and the contacts of the thermostat and the dehumidistat are not both open.

2. An apparatus according to claim 1, further comprising:
   a) a thermostat with contacts that are closed when the ambient air temperature is below its set point and with contacts that are open when the ambient air temperature is above its set point;
   b) a dehumidistat with contacts that are open when the ambient relative humidity is below its set point and with contacts that are closed when the ambient relative humidity is above its set point;
   c) at least one receptacle which is energized if the apparatus itself is energized and the contacts of the thermostat are closed but which is not energized if the contacts of the thermostat are open; and
   d) at least one other receptacle which is energized if the apparatus itself is energized and the contacts of the thermostat and the dehumidistat are not both open.

3. An apparatus according to claim 1, further comprising:
   a) the dehumidistat is energized if the apparatus is energized and
   b) a relay (13) opens and closes a circuit path parallel to the dehumidistat that begins and ends at nodes shared in common with the dehumidistat; which relay has a control circuit controlled by the thermostat and a single pair of normally open contacts that, if the normally open contacts are closed, energize alone or in conjunction with the dehumidistat each receptacle which is energized if the apparatus is energized and the contacts of the thermostat and the dehumidistat are not both open.

4. An apparatus according to claim 1, further comprising a single-pole double-throw electromechanical relay which has a control circuit controlled by the thermostat; normally closed contacts that energize the dehumidistat if the normally closed contacts remain closed and the apparatus is energized; and normally open contacts that, if the normally open contacts are closed, energize each receptacle which is energized if the apparatus itself is energized and the contacts of the thermostat and the dehumidistat are not both open.

5. An apparatus according to claim 1, further comprising:
   a) a NEMA 5-15P plug or a NEMA 5-20P plug and
   b) an overcurrent circuit interrupter (16) which has a rated current no higher than eighty percent of a rated current for the plug and which, when triggered, opens the circuit which brings electrical energy into the apparatus.

6. An apparatus according to claim 1, further comprising an electrical junction box (20) in a shape of a right rectangular prism having five solid faces and one open face, which open face contains a coplanar plurality of pairs of tabs, each tab having a single centered threaded hole and each tab within each pair of tabs attaching to and projecting inwardly from a longer edge of the open face, which longer edge is opposite from and parallel to another longer edge of the open face to which another tab within the pair of tabs is attached with the threaded holes of both tabs within each pair of tabs defining a line perpendicular to both of the opposite parallel longer edges of the open face, the pairs of tabs providing a sufficient number of platforms for attaching to the junction box with screws the thermostat, the dehumidistat, and the receptacles.

7. An apparatus according to claim 6, further comprising:
   a) five polymer panels (21) which superpose upon and attach externally to the five solid faces of the junction box directly or conjoined with standoffs and which join together pairwise to form eight edges which correspond to the eight edges formed pairwise among the five solid faces of the junction box and
   b) a sixth polymer panel (30) coplanar to and intersecting with the open face of the junction box with sufficiently large dimensions to entirely cover the open face of the junction box and with apertures that enable a thermostat which is attached to the junction box, a dehumidistat which is attached to the junction box, and receptacles which are attached to the junction box to articulate with the sixth polymer panel without any discontinuity.

8. A method to deter a growth of mold colonies on interior surfaces of an enclosed structure, the method comprising:
   a) a placement within the structure of a plurality of catchments containing a hygroscopic substance (36);
   b) a placement within the structure of an electric power-supply apparatus (31) comprising:
      i) a cord and a plug for access to a source of electrical energy,
      ii) a thermostat with contacts that are closed if an ambient air temperature is below a set point of the thermostat but are open if the ambient air temperature is above the set point of the thermostat,
      iii) a dehumidistat with contacts that are open if an ambient relative humidity is below a set point of the dehumidistat but are closed if the ambient relative humidity is above the set point of the dehumidistat,
      iv) at least one receptacle which is energized if the apparatus is energized and the contacts of the thermostat are closed but is not energized if the contacts of the thermostat are open, and
      v) at least one other receptacle which is energized if the apparatus is energized and the contacts of the thermostat and the dehumidistat are not both open;
   c) a placement within the structure of at least one portable electric heater (32) that is connected to a receptacle upon the electric power-supply apparatus which is energized if the apparatus is energized and the contacts of the thermostat are closed but is not energized if the contacts of the thermostat are open; and d) a placement within the structure of at least one portable fan (33) that is connected to a receptacle upon the electric power-supply apparatus which is energized if the apparatus is energized and the contacts of the thermostat and the dehumidistat are not both open.

\* \* \* \* \*

UNITED STATES PATENT AND TRADEMARK OFFICE
CERTIFICATE OF CORRECTION

PATENT NO. : 11,561,045 B1
APPLICATION NO. : 16/849965
DATED : January 24, 2023
INVENTOR(S) : Thomas Cline It is certified that error appears in the above-identified patent and that said Letters Patent is hereby corrected as shown below:

On the Title Page

The last line of which reads –8 Claims, 4 Drawing Sheets– should read –7 Claims, 4 Drawing Sheets– as shown on the attached title page In the Claims The entirety of Claim 2 should be deleted On the first line of Claim 3, the identifying number –3– should be changed to –2–

On the first line of Claim 4, the identifying number –4– should be changed to –3–

On the first line of Claim 5, the identifying number –5– should be changed to –4–

On the first line of Claim 6, the identifying number –6– should be changed to –5–

On the first line of Claim 7, the identifying number –7– should be changed to –6– and the phrase which reads –claim 6– should read –claim 5–

On the first line of Claim 8, the identifying number –8– should be changed to –7–

Signed and Sealed this
Fifteenth Day of July, 2025

Coke Morgan Stewart
*Acting Director of the United States Patent and Trademark Office*

CERTIFICATE OF CORRECTION (continued)

(12) United States Patent
Cline (10) Patent No.: US 11,561,045 B1
(45) Date of Patent: Jan. 24, 2023

(54) POWER SUPPLY AND METHOD TO DETER MOLD

(71) Applicant: Thomas Cline, Seattle, WA (US)

(72) Inventor: Thomas Cline, Seattle, WA (US)

(*) Notice: Subject to any disclaimer, the term of this patent is extended or adjusted under 35 U.S.C. 154(b) by 484 days.

(21) Appl. No.: 16/849,965

(22) Filed: Apr. 15, 2020

(51) Int. Cl.
| | |
|---|---|
| *F26B 21/08* | (2006.01) |
| *F24F 3/14* | (2006.01) |
| *H05B 1/02* | (2006.01) |
| *F26B 21/10* | (2006.01) |
| *F24D 19/10* | (2006.01) |
| *F24F 110/10* | (2018.01) |
| *F24F 110/20* | (2018.01) |

(52) U.S. Cl.
CPC ............ *F26B 21/08* (2013.01); *F24F 3/1411* (2013.01); *F26B 21/10* (2013.01); *H05B 1/0297* (2013.01); *F24D 19/1096* (2013.01); *F24F 2110/10* (2018.01); *F24F 2110/20* (2018.01)

(58) Field of Classification Search
CPC ... H05B 1/0297; F24F 3/1411; F24F 2110/10; F24F 2110/20; F26B 21/08; F26B 21/10; H01R 13/66
See application file for complete search history.

(56) References Cited

U.S. PATENT DOCUMENTS

| | | |
|---|---|---|
| 2,053,771 A | 9/1936 | Erschen |
| 3,840,176 A | 10/1974 | Baysinger |
| 4,465,229 A | 8/1984 | Kompelien |
| 4,703,886 A | 11/1987 | Kirby |
| 4,877,182 A | 10/1989 | Pugh |
| 5,082,173 A | 1/1992 | Poehlman |
| 5,232,152 A | 8/1993 | Tsang |
| 5,915,473 A | 6/1999 | Ganesh |
| 6,220,039 B1 | 4/2001 | Kensok |
| 7,340,907 B2 | 3/2008 | Vogh |
| 7,740,184 B2 | 6/2010 | Schnell |
| 7,758,408 B2 | 7/2010 | Hagentoft |
| 7,793,510 B2 | 9/2010 | Perry |
| 8,112,181 B2 | 2/2012 | Remsburg |
| 8,161,761 B2 | 4/2012 | Shao |
| 8,209,059 B2 | 6/2012 | Stockton |
| 8,292,192 B1 | 10/2012 | Purswell |
| 8,393,549 B2 | 3/2013 | Pieper |
| 8,567,688 B2 | 10/2013 | Weisenberger |
| 8,863,536 B1 | 10/2014 | Perry |
| 2005/0085178 A1 | 4/2005 | Hall |
| 2005/0217132 A1 | 10/2005 | Ashford |
| 2006/0217934 A1 | 9/2006 | Armstrong |
| 2011/0101118 A1 | 5/2011 | Criss |

(Continued)

*Primary Examiner* — Nelson J Nieves (57) ABSTRACT

An apparatus and method to deter mold growth on the interior surfaces of buildings. The apparatus is a corded and plugged power supply with adjustable temperature and humidity sensors, logic circuitry, and split duplex receptacles. The method employs the apparatus, a portable heater, an array of portable fans, and catchments containing a hygroscopic substance such as calcium chloride. One receptacle controls the heater. The other receptacle controls the fans. There are three operative states: a heat-on/fans-on state at low temperature, a heat-off/fans-on state at high temperature and high humidity, and an idle state at high temperature and low humidity. The catchments capture water vapor circulated by the fans.

7 Claims, 4 Drawing Sheets